(12) United States Patent
Stephan et al.

(10) Patent No.: US 12,294,564 B2
(45) Date of Patent: May 6, 2025

(54) METHOD FOR RESOLVING NAMING IDENTIFIERS

(71) Applicant: ORANGE, Issy-les-Moulineaux (FR)

(72) Inventors: Emile Stephan, Châtillon (FR); Gaël Fromentoux, Châtillon (FR); Frédéric Fieau, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/786,853

(22) PCT Filed: Dec. 14, 2020

(86) PCT No.: PCT/FR2020/052430
§ 371 (c)(1),
(2) Date: Jun. 17, 2022

(87) PCT Pub. No.: WO2021/123593
PCT Pub. Date: Jun. 24, 2021

(65) Prior Publication Data
US 2023/0044885 A1    Feb. 9, 2023

(30) Foreign Application Priority Data
Dec. 20, 2019   (FR) ..................................... 1915142

(51) Int. Cl.
*H04L 61/4505* (2022.01)
*H04L 61/4511* (2022.01)
*H04L 101/69* (2022.01)

(52) U.S. Cl.
CPC ...... *H04L 61/4511* (2022.05); *H04L 61/4505* (2022.05); *H04L 2101/69* (2022.05)

(58) Field of Classification Search
CPC . H04L 61/4511; H04L 61/3025; H04L 41/35; H04L 41/45; H04L 41/4505; H04L 2101/69
(Continued)

(56) References Cited

U.S. PATENT DOCUMENTS 6,166,198 A * 12/2000 Livingston ............. C07H 21/00
536/25.4
6,166,640 A * 12/2000 Nishihira ............... H05B 47/11
340/567

(Continued)

FOREIGN PATENT DOCUMENTS

CA       2810069 A1 *  4/2012  ............. G06F 16/13

OTHER PUBLICATIONS

Kintis Panagiotis et al., "Understanding the Privacy Implications of ECS", Jun. 12, 2016 (Jun. 12, 2016), Annual International Conference On the Theory and Applications of Cryptographic Techniques, Eurocrypt 2018; [Lecture Notes in Computer Science; Lect.Notes Computer], Springer, Berlin, Heidelberg, pp. 343-353, XP047347176.

(Continued)

*Primary Examiner* — Khanh Q Dinh
(74) *Attorney, Agent, or Firm* — David D. Brush; Westman, Champlin & Koehler, P.A.

(57) ABSTRACT

Method for resolving name identifiers. Existing naming identifier resolution solutions give priority to one aspect, performance of a service or protection of privacy, over the other without it being possible to deviate therefrom. This lack of flexibility is detrimental to the user's quality of experience. This also impacts resource management for various communication equipment involved in the resolution of naming identifiers. The proposed solution makes it possible to give priority to performance or respecting privacy on a case-by-case basis. On the basis of an authorization to share a location of the equipment, the resolver gives priority to transmitting either a network address of a server associated with the naming identifier to be resolved requiring location information of the equipment, giving priority to performance, or a network address of a server associated with the naming identifier to be resolved not requiring (Continued)

Figure 1A:
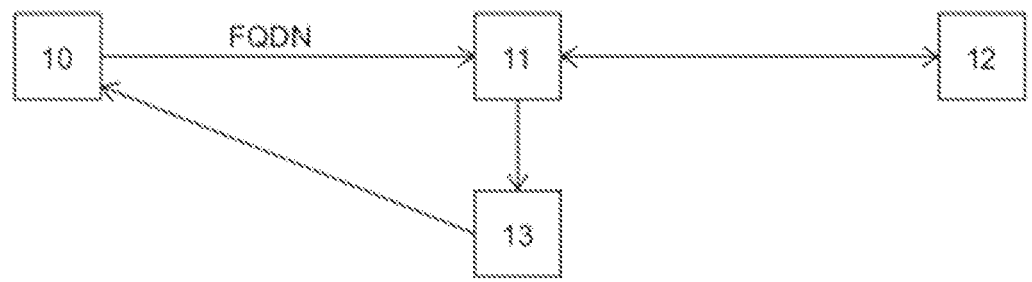

location information of the equipment, giving priority to respecting privacy.

15 Claims, 5 Drawing Sheets

(58) Field of Classification Search
USPC .................................. 709/219–220, 223–228
See application file for complete search history.

(56) References Cited

U.S. PATENT DOCUMENTS

| | | | | |
|---|---|---|---|---|
| 10,135,916 | B1* | 11/2018 | Farhangi | H04L 67/1008 |
| 10,182,033 | B1* | 1/2019 | Farhangi | H04L 43/16 |
| 10,205,698 | B1* | 2/2019 | Petersen | H04L 61/5038 |
| 10,243,919 | B1* | 3/2019 | Suresh | H04L 67/1001 |
| 10,409,875 | B2* | 9/2019 | Mallah | G06F 16/285 |
| 10,491,574 | B1* | 11/2019 | Jung | H04L 63/10 |
| 10,523,986 | B2* | 12/2019 | Lonstein | H04N 21/4788 |
| 10,616,250 | B2* | 4/2020 | Uppal | H04L 9/0643 |
| 11,501,218 | B2* | 11/2022 | Salonen | G06Q 10/109 |
| 2006/0129665 | A1 | 6/2006 | Toebes et al. | |
| 2011/0078104 | A1* | 3/2011 | Honkola | G06N 5/022 |
| | | | | 706/47 |
| 2011/0119306 | A1 | 5/2011 | Patil | |
| 2013/0283033 | A1* | 10/2013 | Ahuja | H04N 21/25875 |
| | | | | 713/150 |
| 2014/0195102 | A1* | 7/2014 | Nathanson | H04W 12/06 |
| | | | | 701/31.4 |
| 2015/0222590 | A1* | 8/2015 | Luo | H04L 63/1458 |
| | | | | 709/245 |
| 2016/0179838 | A1* | 6/2016 | Mavinakuli | G06F 16/176 |
| | | | | 707/618 |
| 2017/0374015 | A1* | 12/2017 | Siba | H04L 61/4511 |
| 2018/0097831 | A1* | 4/2018 | Uppal | H04L 9/3236 |
| 2019/0052726 | A1* | 2/2019 | Power | H04L 61/4511 |
| 2020/0160382 | A1* | 5/2020 | Bryant | G06Q 30/0253 |
| 2021/0056153 | A1* | 2/2021 | Giordani | G06Q 50/01 |
| 2021/0248266 | A1* | 8/2021 | Giubilo | G06F 21/64 |

OTHER PUBLICATIONS

Contavalli W Van Der Gaast Google D Lawrence Akamai Technologies W Kumari Google C, "Client Subnet in DNS Queries; rfc7871.txt", Client Subnet in DNS Queries; RFC7871.TXT, Internet Engineering Task Force, IETF; Standard, Internet Society (ISOC) 4, Rue Des Falaises Ch-1205 Geneva, Switzerland, May 20, 2016 (May 20, 2016), p. 1-30, XP015112866.
Pan Lanlan et al, "Mitigating Client Subnet Leakage in DNS Queries", 2018 16th Annual Conference On Privacy, Security and Trust (PST), IEEE, Aug. 28, 2018 (Aug. 28, 2018), p. 1-2, XP033433516.
T. Hardie, "Distributing Authoritative Name Servers via Shared Unicast Addresses", Memo, Network Working Group, Request for Comments: 3258, Apr. 2002.
J. Abley et al., "Operation of Anycast Services", Memo, Network Working Group, Request for Comments: 4786, Dec. 2006.
P. Hoffman et al., "DNS Queries over HTTPS (DoH)", Internet Engineering Task Force (IETF), Request for Comments: 8484, Category: Standards Track, ISSN: 2070-1721, Oct. 2018.
English translation of the Written Opinion of the International Searching Authority dated Mar. 15, 2021 for corresponding International Application No. PCT/FR2020/052430, filed Dec. 14, 2020.
International Search Report dated Mar. 4, 2021 for corresponding International Application No. PCT/FR2020/052430, Dec. 14, 2020.
Written Opinion of the International Searching Authority dated Mar. 4, 2021 for corresponding International Application No. PCT/FR2020/052430, filed Dec. 14, 2020.

* cited by examiner

METHOD FOR RESOLVING NAMING IDENTIFIERS

CROSS-REFERENCE TO RELATED APPLICATIONS

This Application is a Section 371 National Stage Application of International Application No. PCT/FR2020/052430, filed Dec. 14, 2020, which is incorporated by reference in its entirety and published as WO 2021/123593 A1 on Jun. 24, 2021, not in English.

FIELD OF THE INVENTION

The field of the invention is that of resolving naming identifiers such as domain names. More specifically, the invention relates to the selection of servers associated with naming identifiers to be resolved depending on constraints relating to the protection of privacy expressed by a user of equipment requiring the resolution of a naming identifier.

PRIOR ART AND ITS DRAWBACKS

In the field of naming identifier resolution, three scenarios are distinguished. Such naming identifiers are for example domain names.

FIG. 1A represents a first naming identifier resolution scenario. An equipment 10 transmits a request for resolving naming identifiers FQDN (fully qualified domain name) to a naming identifier resolver 11 managed by an internet service provider ISP from which a user of the equipment 10 has subscribed to a service offer. The resolver 11 regularly exchanges messages with at least one authoritative server 12 associated with a naming identifier. The authoritative server 12 determines, from a network address of the identifier of a subnet in which the equipment 10 is located or from a network address of the resolver 11, the most appropriate servers 13 to serve the resource in an area of the network managed by the resolver 11. A network address is for example an IP (Internet Protocol) address of the IPv4 or IPv6 type. The resolver 11 thus obtains, from the authoritative server 12, IP addresses associated with servers 13 associated with a naming identifier to be resolved, these servers 13 storing data relating to the implementation of a service required by the equipment 10 such as data relating to a web page or data relating to downloadable content, etc.

Once in possession of the IP (Internet Protocol) addresses associated with servers 13, the resolver 11 transmits at least one of the IP addresses associated with servers 13 to the equipment 10. The equipment 10 then establishes a connection with the corresponding server 13 and can access data relating to the implementation of the required service. In this first scenario, the servers 13 associated with a naming identifier to be resolved are either known to the authoritative server 12 as being topologically close to the equipment 10 as described for example on the Wikipedia page referenced https://en.wikipedia.org/wiki/Geolocation software), or known to the authoritative server 12 as being managed by the internet service provider ISP from which a user of the equipment 10 has subscribed to a service offer, thus giving priority in particular to the performance of the service.

Figure 1B:
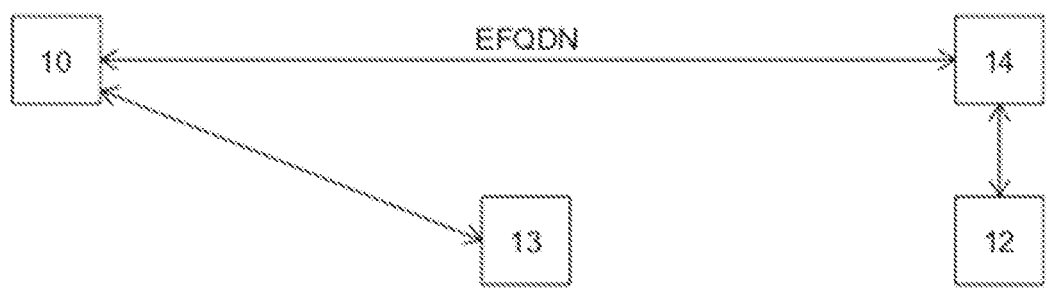

FIG. 1B represents a second naming identifier resolution scenario, the elements common to FIG. 1A are numbered identically. The equipment 10 transmits, in an encrypted connection, a request for resolving naming identifiers ERQDN to a public naming identifier resolver 14 managed by a third-party company. On receipt of the encrypted request for resolving naming identifiers EFQDN (External FQDN) naming identifiers, the public resolver 14 transmits a message comprising an identifier of a subnet in which the equipment 10 is located to the authoritative server 12 associated with a naming identifier. The public resolver 14 thus obtains, from the authoritative server 12, IP (Internet Protocol) addresses associated with servers 13 associated with the naming identifier to be resolved, these servers 13 storing data relating to the implementation of a service required by the equipment 10 such as data relating to a web page or data relating to a downloadable content, etc.

Once in the possession of the IP (Internet Protocol) addresses associated with servers 13, the public resolver 14 transmits at least one of the IP addresses associated with servers 13 to the equipment 10. The equipment 10 then establishes a connection with the corresponding server 13 and can access the data relating to the implementation of the required service. In this second scenario, the authoritative server 12 having knowledge of the location of the equipment 10, it provides the equipment 10 of the IP addresses relating to servers 13 associated with a naming identifier to be resolved which are either topologically close or managed by the internet service provider ISP from which a user of the equipment 10 has subscribed to a service offer, also giving priority to the performance of the service.

Figure 1C:
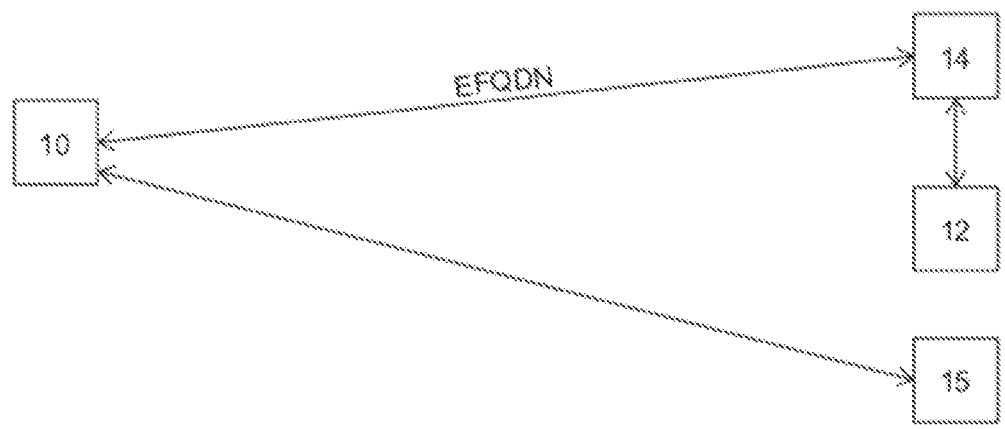

FIG. 1C represents a third naming identifier resolution scenario, the common elements in FIG. 1a and FIG. 1b are numbered identically. The equipment 10 transmits an encrypted request for resolving naming identifiers EFQDN to a public naming identifier resolver 14 managed by a third-party company. Upon receipt of the encrypted request for resolving naming identifiers EFQDN, the public resolver 14 transmits a message to the authoritative server 12 associated with a naming identifier. The public resolver 14 then obtains, from the authoritative server 12, IP (Internet Protocol) addresses associated with servers associated with the naming identifier to be resolved, these servers 15 storing data relating to the implementation of a service required by the equipment 10 such as data relating to a web page or data relating to a downloadable content, etc. Such servers are located in a distinct third-party network which is not managed by the internet service provider ISP from which a user of the equipment 10 has subscribed to a service offer.

Once in the possession of the IP (Internet Protocol) addresses associated with servers 15, the public resolver 14 transmits at least one of the IP addresses associated with servers 15 to the equipment 10. The equipment 10 then establishes a connection with the corresponding server 15 and can access the data relating to the implementation of the required service. In this third scenario, the respect for privacy of the user of the equipment 10 is given priority since the location of the equipment is never shared.

Each of the three previous scenarios gives priority to an aspect, performance of the service or protection of privacy, relative to the other without it being possible to deviate therefrom. Such a lack of flexibility is detrimental to the user's quality of experience of the equipment. This also impacts the resource management for the various communication equipment involved in the resolution of naming identifiers which may not be used optimally. Furthermore, this impacts the load of the inter-domain links.

There is therefore a need for a naming identifier resolution technique that does not have all or part of the aforementioned drawbacks.

DISCLOSURE OF THE INVENTION

The invention responds to this need by proposing a method for resolving at least one naming identifier, said method being implemented by a naming identifier resolver and comprising the following steps:

reception of at least one network address of a first server associated with a naming identifier, the first server requiring a parameter relating to equipment requiring a resolution of the naming identifier, transmission, to the equipment requiring the resolution of said naming identifier, of the network address associated with the first server depending on a value of a piece of information of authorisation to share said parameter representative of said equipment.

In a variant of the method for resolving at least one naming identifier, said method further comprises:

a step of receiving at least one network address of a second server associated with said naming identifier, the second server requiring no parameter relating to said equipment, transmission, to the equipment requiring the resolution of said naming identifier, of the IP address associated with the second server depending on a piece of information of authorisation to share said parameter representative of said equipment.

Such a solution allows giving priority to the performance or the respect for privacy of a user of the equipment who has required the resolution of a naming identifier on a case-by-case basis.

Indeed, depending on a value of the piece of information of authorisation to share the location parameter of the equipment, the resolver transmits either a network address of a server associated with the naming identifier to be resolved requiring piece of information of location of the equipment, thus giving priority to the performance, or a network address of a server associated with the naming identifier to be resolved not requiring a piece of information of location of the equipment, thus giving privilege to respect for privacy. The resolver can also transmit the IP addresses of the two servers, associated with the naming identifier to be resolved, to the user equipment.

Thus, a user of a device can choose, when browsing the Internet, to give priority to respect for his privacy or the performance of the consulted service.

According to one embodiment of the method for resolving at least one naming identifier, when the resolver has the piece of information of authorisation to share said location parameter of said equipment, the resolver transmits said at least one network address from one of the two servers to the equipment requiring the resolution of said naming identifier.

In a first case, the piece of information of authorisation to share the location parameter of the equipment is a sharing authorisation. In this first case, knowing that the user of the equipment gives his agreement to share the location of the equipment, the resolver transmits the network address of a server associated with the naming identifier to be resolved requiring a piece of information of location of the equipment. Such a scenario gives priority to performance. Indeed, the server, thus selected, is most often located in the same subnet as the equipment, which offers short response or transfer times. Such a configuration is particularly interesting when the consulted service is for example a continuous content service or streaming.

In a second case, the piece of information of authorisation to share the location parameter of the equipment is a sharing prohibition. In this second case, knowing that the user of the equipment does not agree to share the location of the equipment, the resolver transmits the network address of a server associated with the naming identifier to be resolved requiring no a piece of information of location of the equipment. Such a scenario gives priority to respect for privacy. Indeed, the server thus selected is most often located in a remote network.

According to another embodiment of the method for resolving at least one naming identifier, when the resolver does not have the piece of information of authorisation to share said location parameter of said equipment, the resolver transmits said at least one network address of the first server and said at least one network address of the second server to the equipment requiring the resolution of said naming identifier.

For example, in such an embodiment, the user of the equipment has not specified whether or not he wishes to share the location of the equipment. Thus, in the absence of a piece of information, the resolver transmits both the network address of a server associated with the naming identifier to be resolved requiring a piece of information of location of the equipment and the network address of a server associated with the naming identifier to be resolved requiring no a piece of information of location of the equipment. The resolver thus delegates the selection of the server with which to establish a communication with the equipment.

According to another embodiment of the method for resolving at least one naming identifier, said method comprises a step of receiving a message comprising the piece of information of authorisation to share said location parameter of the equipment, said message being transmitted by the equipment.

The equipment thus transmits a piece of information for sharing the location parameter of the equipment to the resolver in an explicit manner.

According to a particular implementation of the method for resolving at least one naming identifier, the message comprising the piece of information of authorisation to share said location parameter of the equipment is a request for resolving the naming identifier transmitted by the equipment.

In this implementation, the piece of information for sharing the location parameter of the equipment being comprised in the request for resolving the naming identifier, it is only valid for this request for resolving the naming identifier.

According to another particular implementation of the method for resolving at least one naming identifier, the message comprising the piece of information of authorisation to share said location parameter of the equipment is a request message for establishing a communication session, between the equipment and the naming identifier resolver, transmitted by the equipment.

In this implementation, the piece of information of authorisation to share the location parameter of the equipment being comprised in the message for establishing a communication session between the equipment and the resolver, the piece of information for sharing the location parameter of the equipment is applied to all requests for resolving naming identifiers transmitted by the equipment during the communication session.

In one embodiment of the method for resolving at least one naming identifier, said method comprises, prior to the reception step, a step of transmitting at least one message requiring the transmission of at least one network address of a first server and at least one network address of a second server both associated with the same naming identifier, the first server requiring a location parameter of equipment requiring a resolution of the naming identifier, and the second server requiring no location parameter of the equipment.

When the IP addresses of the two servers associated with the naming identifier to be resolved are not stored in a cash memory of the resolver, the latter transmits a request to obtain this piece of information. This request can be, for example, transmitted to an authoritative server associated with the naming identifier to be resolved.

The invention also relates to a method for requesting a resolution of at least one naming identifier, said method being implemented by equipment and comprising at least:
- one step of transmitting a message, comprising a piece of information of authorisation to share a location parameter of the equipment to a naming identifier resolver According to one variant of the method for requesting a resolution of at least one naming identifier, the message comprising the piece of information of authorisation to share said location parameter of the equipment is a request for resolving the naming identifier.

According to another variant of the method for requesting a resolution of at least one naming identifier, the message comprising the piece of information of authorisation to share said location parameter of the equipment is a request message for establishing a communication session between the equipment and the naming identifier resolver.

Another object of the invention is a communication method between an authoritative server and a naming identifier resolver, said method being implemented by the authoritative server and comprising at least:
- one step of transmitting at least one network address of a first server and at least one network address of a second server both associated with the same naming identifier, the first server requesting a location parameter of equipment requiring a resolution of the naming identifier, and the second server requiring no location parameter of said equipment.

The invention also relates to a naming identifier resolver comprising means for:
- receiving at least one network address of a first server associated with a naming identifier to be resolved, the first server requiring a parameter relating to equipment requiring a resolution of the naming identifier,
- transmitting, to the equipment requiring the resolution of said naming identifier, said at least one network address associated with the first server depending on a piece of information of authorisation to share said parameter relating to said equipment.

Another object of the invention is equipment requiring resolution of at least one naming identifier, said equipment comprising means for:
- transmitting a message, comprising a piece of information of authorisation to share a location parameter of the equipment, to a naming identifier resolver.

The invention also relates to an authoritative server capable of communicating with at least one naming identifier resolver, said authoritative server comprising means for:
- transmitting at least one network address of a first server and at least one network address of a second server both associated with the same naming identifier to be resolved, the first server requiring a location parameter of equipment requiring the resolution of the naming identifier, and the second server requiring no location parameter of said equipment.

Finally, the invention finally relates to computer program products comprising program code instructions for implementing methods as previously described, when executed by a processor.

The invention also relates to a computer-readable recording medium on which computer programs comprising program code instructions, for executing the steps of the methods according to the invention as described above, are recorded.

Such a recording medium can be any entity or device capable of storing the programs. For example, the support may include storage means, such as a ROM, for example a CD ROM or a ROM of microelectronic circuit, or else magnetic recording means, for example a USB key or a hard disk.

On the other hand, such a recording medium may be a transmissible support such as an electrical or optical signal, which can be routed via an electrical or optical cable, by radio or by other means, such that the computer programs it contains are remotely executable. The programs according to the invention may in particular be downloaded to a network for example the Internet.

Alternatively, the recording medium may be an integrated circuit in which the programs are incorporated, the circuit being adapted to execute or to be used in the execution of the aforementioned methods of the invention.

LIST OF FIGURES

Figure 2:
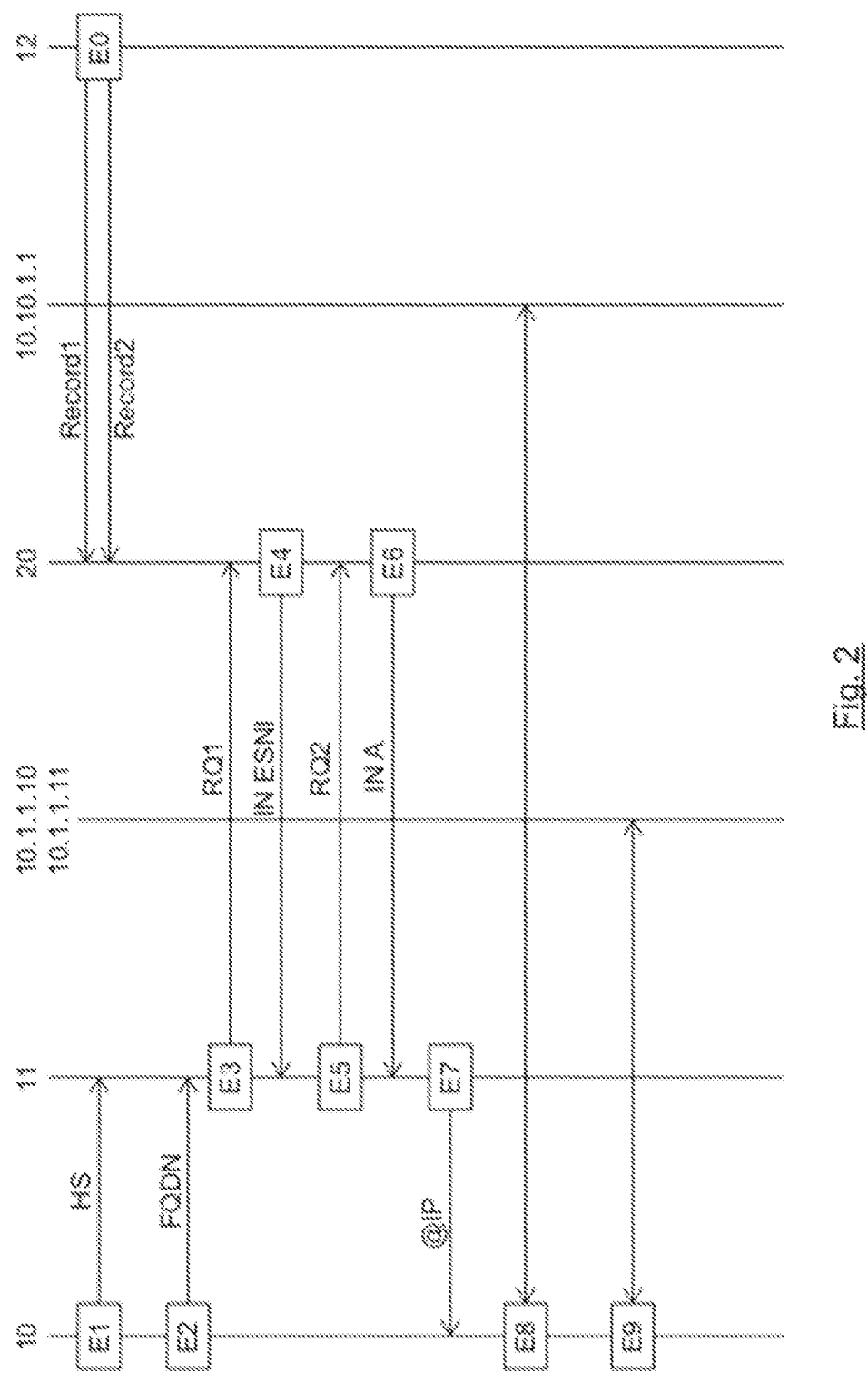
Figure 3:
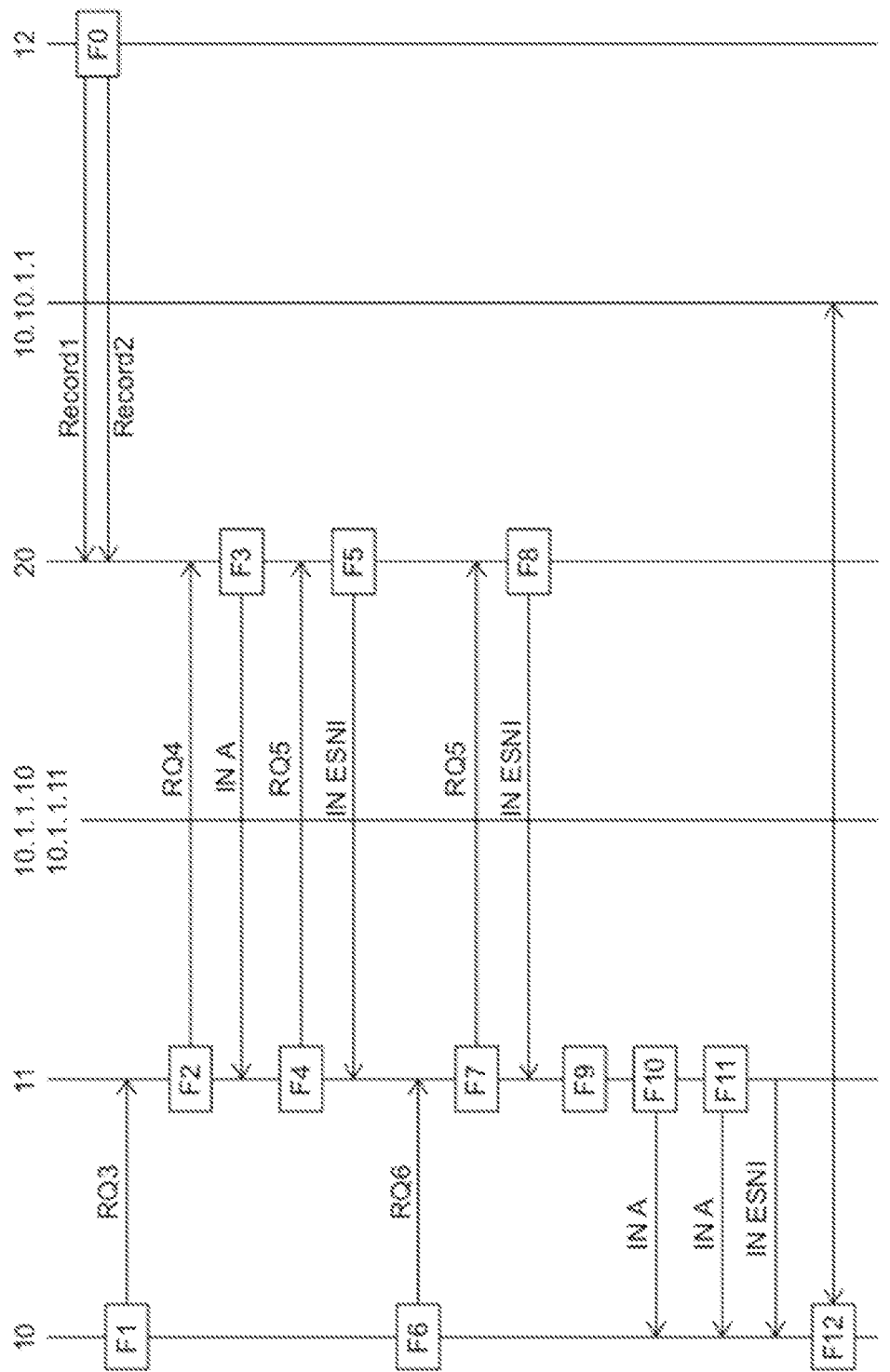
Figure 4:
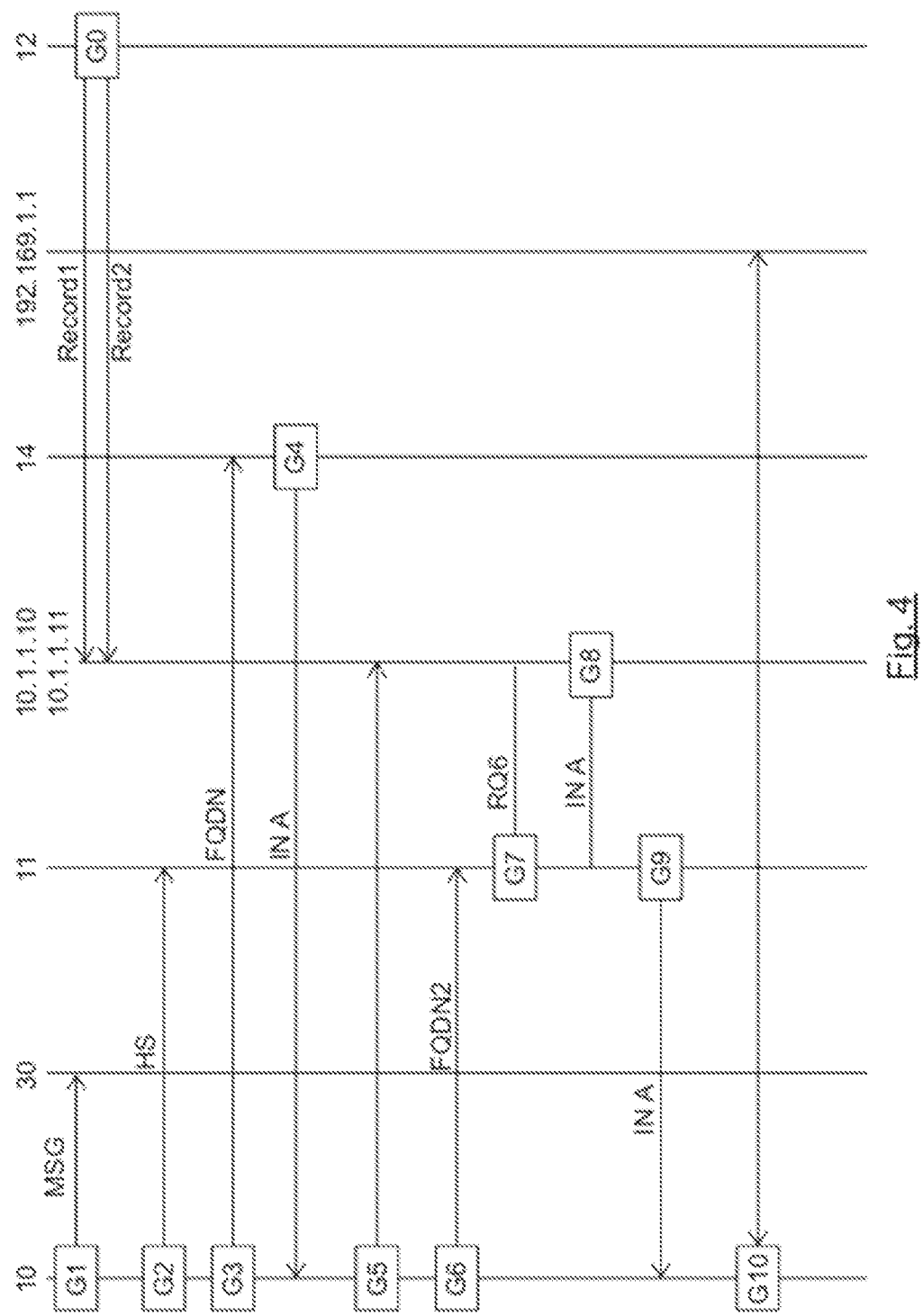
Figure 5:
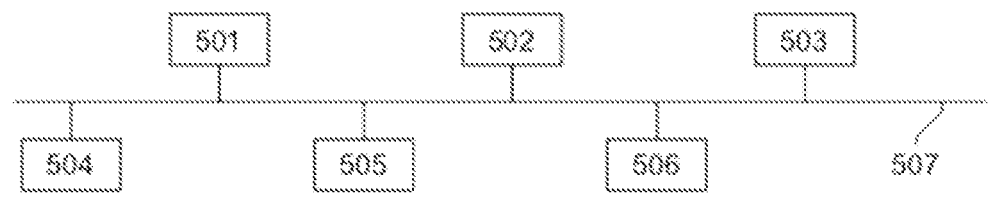

Other aims, features and advantages of the invention will appear more clearly on reading the following description, given by way of a simple illustrative, and not limiting, example in relation to the figures, among which:

FIG. 1A: this Figure represents a first naming identifier resolution scenario,

FIG. 1B: this Figure represents a second naming identifier resolution scenario,

FIG. 1C: this Figure represents a third naming identifier resolution scenario,

FIG. 2: this Figure represents a diagram of exchanges between different communication equipment involved in a first mode of implementation of the methods for resolving at least one naming identifier, for requesting a resolution of at least one naming identifier and of communication between an authoritative server and a naming identifier resolver, FIG. 3: this Figure represents a diagram of exchanges between different communication equipment involved in a second mode of implementation of the methods for resolving at least one naming identifier, for requesting a resolution of at least one naming identifier and of communication between an authoritative server and a naming identifier resolver, FIG. 4: this Figure represents a diagram of exchanges between different communication equipment involved in a third mode of implementation of the methods for resolving at least one naming identifier, for requesting a resolution of at least one naming identifier and of communication between an authoritative server and a naming identifier resolver, FIG. 5: this Figure represents equipment 10 according to one embodiment of the invention. Such equipment 10 is capable of implementing the different embodiments of the method for requesting a resolution of a naming identifier, FIG. 6: this Figure represents a resolver 11 capable of implementing the different embodiments of the naming identifier resolution method, FIG. 7: this Figure represents an authoritative server 12 capable of implementing the different embodiments of the communication method.

DETAILED DESCRIPTION OF EMBODIMENTS OF THE INVENTION

The general principle of the invention is based, on the one hand, on the provision, to a naming identifier resolver, of a piece of information of authorisation to share a parameter relating to equipment requiring a resolution of a naming identifier and, on the other hand, on the transmission, to the naming identifier resolver by authoritative servers, of IP addresses associated with servers associated with the naming identifier to be resolved, some servers requiring a location parameter of the equipment requiring a naming identifier resolution, and other servers requiring no location parameter of the equipment.

There is shown, in relation to FIG. 2 a diagram of exchanges between different communication equipment involved in a first mode of implementation of the methods for resolving at least one naming identifier, for requesting a resolution of at least one naming identifier and of communication between an authoritative server and a naming identifier resolver.

During a step E1, an equipment 10 transmits a request message for establishing a communication session HS to a naming identifier resolver 11. Such a message for establishing a communication session is for example a message of the DoH HTTPS handshake type (DoH meaning DNS over HTTPS) specified in the document RFC8484 (Request for Comment) published by the IETF (Internet Engineering Task Force).

Once the communication session has been established between the equipment 10 and the resolver 11, the equipment 10 transmits, in a step E2, a request for resolving naming identifier FQDN to the resolver 11 for the naming identifier journal.fr. This request for resolving naming identifier FQDN is for example a message of the DoH query type also specified in the document RFC8484 of the IETF.

In a first embodiment, a field, HTTP DNS_RELAY_CONSENT, of the message for establishing a communication session DoH HTTPS is used to convey a piece of information of authorisation to share a parameter relating to the equipment 10. Such a parameter relating to the equipment is for example a location parameter of the equipment 10. In another embodiment, such a parameter relating to the equipment 10 is for example a piece of information relating to the nature of the equipment 10, such as user terminal, resolver, etc. The parameter relating to equipment 10 can also be a piece of information on the computing power of the equipment 10. In the remainder of the document, the parameter relating to the equipment 10 is a location parameter.

Such a piece of information is either an authorisation to share in which case the HTTP DNS_RELAY_CONSENT field comprises a piece of information TRUE, or a refusal to share in which case the HTTP DNS_RELAY_CONSENT field comprises a piece of information FALSE.

In this first embodiment, the piece of information for sharing the location parameter of the equipment 10 being comprised in the message for establishing a communication session between the equipment 10 and the resolver 11, the piece of information for sharing the location parameter of the equipment is applied to all requests for resolving naming identifiers transmitted by the equipment 10 during the communication session.

In a second embodiment, the field, HTTP DNS_RELAY_CONSENT, of request for resolving naming identifier RQDN is used to convey the piece of information of authorisation to share a location parameter of the equipment 10. Such a piece of information is either an authorisation to share in which case the HTTP DNS_RELAY_CONSENT field comprises a piece of information TRUE, or a refusal to share in which case the HTTP DNS_RELAY_CONSENT field comprises a piece of information FALSE.

In this second embodiment, the piece of information for sharing a location parameter of the equipment 10 being comprised in the request for resolving naming identifier RQDN, the piece of information for sharing the location parameter of the equipment only applies to this request for resolving the naming identifier journal.fr.

Upon receipt of the request for resolving naming identifier RQDN for the naming identifier journal.fr, the resolver 11 transmits, in a step E3, a first request RQ1 for resolving a naming identifier associated with the naming identifier journal.fr. The request RQ1 is transmitted to one or more servers 20 constituting a network of DNS nodes. The servers 20 store, in cache, IP addresses of servers associated with the same naming identifier, some of these servers requiring a location parameter of the equipment 10, and other servers requiring no location parameter of the equipment 10.

The servers 20 receive, during a step E0, the IP addresses of servers associated with the same naming identifier, some of these servers requiring a location parameter of the equipment 10, and other servers requiring no location parameter of the equipment 10. This piece of information is transmitted by authoritative servers 12 associated with naming identifiers.

Thus, during step E0, the authoritative server 12 associated with the naming identifier journal.fr transmits a first message Record 1 such that, for example, a DNS record ESNI type message comprising an extension called "geo" extension comprising a parameter relating to a location of equipment 10, to a server 20. An example of such a message Record 1 is given below:

DNS record ESNI: {journal.fr, ESNIKeys: { . . . }, extension: {geo: 10.1.1.0/24}

The 'geo' extension gives the list of the content servers which are regionalised: In the example it is the IP address mask: 10.1.1.0/24.

The authoritative server 12 associated with the naming identifier journal.fr also transmits a second message Record 2 such that, for example, a DNS record type message comprising a list of IP addresses associated with servers 13, 15 associated with the naming identifier journal.fr, to a server 20. An example of such a message Record 2 is given below:

DNS record journal.fr IN A: 10.10.1.1, 10.1.1.10, 10.1.1.11

The server 20 applies the 'geo' extension to the content of the message Record 2 in order to identify regionalised servers {10.10.1.1, 10.1.1.10} and, on the other hand, a global server {10.1.1.11}.

Step E0 is implemented upon receipt of a request transmitted by a server 20 when it does not have, in the cache memory thereof, the piece of information necessary to resolve a naming identifier. In the context of the invention, step E0 can be implemented throughout the execution of the described methods.

The request RQ1 transmitted by the resolver 11 is for example a message of the DNS query ESNI (Domain Name System Query Encrypted Server Name Indication). Upon receipt of this request RQ1, the server 20 transmits a message IN ESNI to the resolver 11 in a step E4.

An example of such a message IN ESNI is as follows: IN ESNI { . . . {geo: 10.1.1.0/24}}. Thus, at the end of step E4, the resolver 11 has an IP address mask: 10.1.1.0/24.

In a step E5, a second request RQ2 for resolving a naming identifier associated with the naming identifier journal.fr is transmitted to one or more servers 20 constituting a network of DNS nodes by the resolver 11.

The request RQ2 transmitted by the resolver 11 is for example a message of the DNS query journal.fr type. Upon receipt of this request RQ2, the server 20 transmits a message IN A to the resolver 11 in a step E6.

An example of such a message IN A is as follows: IN A 10.10.1.1, 10.1.1.10, 10.1.1.11. Thus, at the end of step E6, the resolver 11 has a list of IP addresses associated with servers associated with the naming identifier journal.fr.

In a step E7, the resolver 11 determines, depending on the piece of information of authorisation to share a location parameter of the equipment which is received during step E1 or during step E2, which network address it must transmit to the equipment 10 in response to the request for resolving the naming identifier journal.fr.

If the piece of information of authorisation to share a location parameter of the equipment 10 is a refusal to share, the resolver 11 applies the mask 10.1.1.0/24 received during step E4 and identifies the server whose network address 10.10.1.1 does not belong to the mask. This means that this server is located in a remote network and that it is not necessary to have a piece of information of location of the equipment 10 to communicate with this server.

In a step E8, the equipment 10 establishes a communication with the server whose network address is 10.10.1.1.

If the piece of information of authorisation to share a location parameter of the equipment 10 is an authorisation to share, the resolver 11 applies the mask 10.1.1.0/24 received during step E4 and identifies the servers whose IP addresses 10.1.1.10, and 10.1.1.11 belong to the mask. This means that these servers are close to the equipment 10 since each IP address mask transmitted by an authoritative server corresponds to a particular subnet.

In a step E9, the equipment 10 establishes a communication session with one of the servers whose IP addresses are 10.1.1.10, 10.1.1.11.

There is shown, in relation to FIG. 3 a diagram of exchanges between different communication equipment involved in a second mode of implementation of the methods for resolving at least one naming identifier, for requesting a resolution of at least one naming identifier and of communication between an authoritative server and a naming identifier resolver.

In a step F1, the equipment 10 transmits a first request RQ3 to the resolver 11 for the naming identifier journal.fr. The request RQ3 transmitted by the equipment 10 is for example a message of the DNS query journal.fr type.

In a first embodiment, upon receipt of the request RQ3, the resolver 11 transmits, in a step F2, a second request RQ4 for resolving a naming identifier associated with the naming identifier journal.fr. The request RQ41 is transmitted to one or more servers 20 constituting a network of DNS nodes. The servers 20 store, in cache, IP addresses of servers associated with the same naming identifier, some of these servers requiring a location parameter of the equipment 10, and other servers requiring no location parameter of the equipment 10.

The servers 20 receive, during a step E0, the IP addresses of servers associated with the same naming identifier, some of these servers requiring a location parameter of the equipment 10, and other servers requiring no location parameter of the equipment 10. This piece of information is transmitted by authoritative servers 12 associated with naming identifiers.

Thus, during step E0, the authoritative server 12 associated with the naming identifier journal.fr transmits a first message Record 1 such as, for example, a DNS record ESNI type message comprising an extension called "anycast" extension comprising a parameter relating to a location of the equipment whose network addresses are 10.1.1.10 and 10.1.1.11, to a server 20. An example of such a message Record 1 is given below:

DNS record ESNI: {journal.fr, ESNIKeys: { . . . }, extension: {anycast: 10.1.1.0/24}

Herein, the parameter relating to a location of a device 10 is an IP address mask:

"Anycast" is an addressing and routing technique allowing data to be redirected to the "closest" or "most efficient" server from a set of servers using a single address, according to the chosen routing policy.

The "anycast" routing technique is usually implemented using the BGP (Boarder Gateway Protocol) protocol which simultaneously announces the same range of IP addresses accessible from several places of a communication network. In this manner, data packets are routed to the "nearest" network node announcing the destination route.

The "anycast" routing technique is described in the document RFC 4786 published by the IETF.

For this reason, the "anycast" routing technique is usually used to provide high availability and load distribution for services in non-connected mode. The document RFC 3258 describes how the "anycast" routing technique is used to provide a naming identifier resolution service.

The authoritative server 12 associated with the naming identifier journal.fr also transmits a second message Record 2 such as, for example, a DNS record type message comprising a list of IP addresses associated with servers 13, 15 associated with the naming identifier journal.fr, to a server 20. An example of such a message Record 2 is given below:

DNS record journal.fr IN A: 10.10.1.1, 10.1.1.10, 10.1.1.11

Step E0 is implemented upon receipt of a request transmitted by a server 20 when said server does not have, in the cache memory thereof, the piece of information necessary for resolving a naming identifier. Within the scope of the invention, step E0 can be implemented throughout the execution of the described methods.

The request RQ3 transmitted by the resolver 11 is for example a message of the DNS query journal.fr type.

Upon receipt of this request RQ3, the server 20 transmits, in a step F3, a message IN A to the resolver 11.

An example of such a message IN A is: IN A 10.10.1.1, 10.1.1.10, 10.1.1.11.

In a step F4, a third request RQ5 for resolving a naming identifier associated with the naming identifier journal.fr is transmitted to one or more servers 20 constituting a network of DNS nodes by the resolver 11.

Thus, at the end of step F4, the resolver 11 has an IP address mask: 10.1.1.0/24

The request RQ5 transmitted by the resolver 11 is for example a message of the DNS query ESNI (Domain Name System query Encrypted Server Name Indication) type. Upon receipt of this request RQ5, the server 20 transmits a message IN ESNI to the resolver 11 in a step F5.

An example of such a message IN ESNI is: IN ESNI { ... {anycast: 10.1.1.0/24}}. Thus, at the end of step F5, the resolver 11 has an IP address mask: 10.1.1.0/24.

In a second particular embodiment, steps F4 and F5 are not implemented. Following step F3, the equipment 10 transmits a fourth request RQ6 to the resolver 11 in a step F6. The request RQ6 transmitted by the equipment 10 is for example a message of the DNS query ESNI (Domain Name System query Encrypted Server Name Indication) type associated with the naming identifier journal.fr.

In a step F7, the request RQ5 for resolving a naming identifier associated with the naming identifier journal.fr is transmitted by the resolver 11 to one or more servers 20 constituting a network of DNS nodes.

The query RQ5 transmitted by the resolver 11 is for example a message of the DNS query ESNI (Domain Name System query Encrypted Server Name Indication) type. Upon receipt of this request RQ5, the server 20 transmits a message IN ESNI to the resolver 11 in a step F8.

An example of such a message IN ESNI is: IN ESNI { ... {anycast: 10.1.1.0/24}}. Thus, at the end of step F8, the resolver 11 has an IP address mask: 10.1.1.0/24.

In the first embodiment relating to FIG. 3, during a step F9, the resolver 11 determines, according to a piece of information of authorisation to share a location parameter of the equipment 10 which network address it must transmit to the equipment 10 in response to the request for resolving the naming identifier journal.fr. The resolver 11 is for example configured to select "anycast" type IP addresses. Thus, the resolver 11 applies the mask 10.1.1.0/24 received during step F5 and identifies the servers whose network addresses are 10.1.1.10, and 10.1.1.11 belong to the mask. This means that these servers are close to the direction of the authoritative server of the equipment 10 since each IP addresses mask transmitted by an authoritative server corresponds to a particular subnet.

Then, in a step F10, the resolver 11 transmits a message IN A to the equipment 10. An example of such a message IN A is the following: IN A 10.1.1.10, 10.1.1.11.

In the second embodiment relating to FIG. 3, during a step F11, the resolver 11 transmits a message IN A to the equipment 10. An example of such a message IN A is as follows: IN A 10.10.1.1, 10.1.1.10, 10.1.1.11 and the following message IN ESN I: IN ESNI { ... {anycast: 10.1.1.0/24}}.

The equipment 10 determines, in a step F12, depending on a piece of information of authorisation to share a location parameter of the equipment 10, the server with which to establish a communication session.

There is shown, in relation to FIG. 4 a diagram of exchanges between different communication equipment involved in a third mode of implementation of the methods for resolving at least one naming identifier, for requesting a resolution of at least one naming identifier and of communication between an authoritative server and a naming identifier resolver.

The servers whose IP addresses are 10.1.1.10, 10.1.1.11, and which are regional servers, store, in cache, IP addresses of servers associated with the same naming identifier, some of these servers requiring a location parameter of the equipment 10, and other servers requiring no location parameter of the equipment 10.

The servers whose IP addresses are 10.1.1.10, 10.1.1.11 receive, during a step G0, the IP addresses of servers associated with the same naming identifier, some of these servers requiring a location parameter of the equipment 10, and other servers requiring no location parameter of the equipment 10. This piece of information is transmitted by authoritative servers 12 associated with naming identifiers.

Thus, during step G0, the authoritative server 12 associated with the naming identifier journal.fr transmits a first message Record 1 such as, for example, a DNS record ESNI type message comprising an extension called "geo" extension comprising a parameter relating to a location of equipment 10, to a server 20. An example of such a message Record 1 is given below:

DNS record ESNI: {journal.fr, ESNIKeys: { ... } extension: {geo: 10.1.1.0/24}

Herein, the parameter relating to a location of equipment 10 is an IP address mask: 10.1.1.0/24.

The authoritative server 12 associated with the naming identifier journal.fr also transmits a second message Record 2 such as, for example, a DNS record type message comprising a list of IP addresses associated with servers 13, 15 associated with the naming identifier journal.fr, to a server whose IP address is 10.1.1.10, or 10.1.1.11. An example of such a message Record 2 is given below:

DNS record journal.fr IN A: 10.10.1.1, 10.1.1.10, 10.1.1.11

Step G0 is implemented upon receipt of a request transmitted by a server whose IP address is 10.1.1.10, or 10.1.1.11 when said server does not have, in the cache memory thereof, the piece of information necessary for the resolution of a naming identifier. Within the scope of the invention, step G0 can be implemented throughout the execution of the described methods.

During a step G1, a device 10 receives a DHCP (Dynamic Host Configuration Protocol) RA (Router Advertisement) type message MSG transmitted by a communication equipment 30 of the internet service provider IPS from which the user of the equipment 10 has subscribed to an offer. Such a message MSG comprises a piece of information allowing selecting a server associated with a naming identifier with which the equipment 10 can establish a communication session. An example of a message MSG is as follows:

```
Hints = {
// domain, scope, resolver
[«orange.com, «local', «intranet'],
[«orange.fr, «host', «isp'],
[«journal.fr, «subnet', «any'],
[«.fr, null, «any'],
}
```

During a step G2, the device 10 transmits a request message for establishing a communication session HS to the naming identifier resolver 11. Such a message for establishing a communication session is for example a DoH HTTPS handshake type message (DoH meaning DNS over HTTPS) specified in the document RFC8484 published by the IETF.

A field, DoH Hints, of the message for establishing a communication session DoH HTTPS handshake is used to convey a piece of information for selecting a server associated with a naming identifier to be resolved. Such a piece of information is one of the pieces of information contained in the message MSG.

An example of a message HS is the following: DoH Hints={//domain ... «any'}

Once the communication session has been established between the equipment 10 and the resolver 11, the equipment 10 transmits, in a step G3, a request for resolving the naming identifier FQDN to a public resolver 14 for the naming identifier journal.fr. This request for resolving the naming identifier FQDN is for example a message of the DoH query type.

A field, HTTP DNS_RELAY_VIEW, of the request for resolving naming identifier RQDN is used to convey the piece of information for selecting the server associated with the naming identifier to be resolved.

An example of such a field is: HTTP DNS_RELAY_VIEW=«subnet'.

In this second embodiment, the piece of information for sharing the location parameter of the equipment being comprised in the request for resolving naming identifier RQDN, the piece of information for sharing the location parameter of the equipment only applies to this request for resolving the naming identifier journal.fr.

In a step G4, the public resolver 14 transmits a message IN A comprising the IP addresses of servers associated with the naming identifier to be resolved and being located in the same subnet as the equipment 10, to the equipment 10. An example of such a message IN A is: IN A 10.1.1.10, 10.1.1.11.

In a step G5, the equipment 10 establishes a communication session with one of the servers whose IP addresses are 10.1.1.10, or 10.1.1.11.

During a step G6, the equipment 10 transmits in a step E2, a second request for resolving the naming identifier FQDN2 to the resolver 11 for the naming identifier orange.fr. This request for resolving the naming identifier FQDN2 is for example a message of the DoH query type.

A field, HTTP DNS_RELAY_VIEW, of the request for resolving the naming identifier FQDN2 is used to convey the piece of information for selecting the server associated with the naming identifier to be resolved.

An example of such a field is as follows: HTTP DNS_RELAY_VIEW=«host».

In a step G7, the resolver 11 transmits a request RQ6 of the DNS query orange.fr type to a server whose network address is 10.1.1.10, or 10.1.1.11.

The server whose network address is 10.1.1.10, or 10.1.1.11 has received during step G0 a DNS record orange.fr type message IN A 192.169.1.1 transmitted by a server associated with the naming identifier orange.fr whose network address is 192.169.1.1.

Upon receipt of this request RQ6, the server whose IP address is 10.1.1.10, or 10.1.1.11 transmits, in a step G8, a message IN A to the resolver 11.

An example of such a message IN A is: IN A 192.169.1.1.

In a step G9, the resolver 11 transmits a message IN A to the equipment 10. An example of such a message IN A is the following: IN A 192.169.1.1.

The equipment 10 establishes, in a step G10, a communication session with the server associated with the naming identifier orange.fr whose network address is 192.169.1.1.

FIG. 5 represents equipment 10 according to one embodiment of the invention. Such equipment 10 is capable of implementing the different embodiments of the method for requesting a resolution of a naming identifier according to FIGS. 2-4.

Equipment 10 can comprise at least one hardware processor 501, one storage unit 502, one input device 503, one display device 504, one interface 505, and at least one network interface 506 which are connected to each other through of a bus 507. Of course, the constituent elements of the equipment 10 can be connected by means of a connection other than a bus.

The processor 501 controls the operations of the equipment 10. The storage unit 502 stores at least one program for the implementation of the method according to one embodiment of the invention to be executed by the processor 501, and various data, such as parameters used for calculations performed by the processor 501, intermediate data of calculations performed by the processor 501, etc. Processor 501 may be formed by any known and appropriate hardware or software, or by a combination of hardware and software. For example, the processor 501 can be formed by a dedicated hardware such as a processing circuit, or by a programmable processing unit such as a Central Processing Unit which executes a program stored in a memory thereof.

The storage unit 502 may be formed by any appropriate means capable of storing the program(s) and data in a computer readable manner. Examples of storage unit 502 comprise non-transitory computer-readable storage media such as semiconductor memory devices, and magnetic, optical, or magneto-optical recording media loaded into a read and write unit.

The input device 503 can be formed by a keyboard, a pointing device such as a mouse to be used by a user to enter commands. The display device 504 can also be formed by a display module, such as for example a graphical user interface or GUI.

The interface 505 provides an interface between the equipment 10 and another equipment.

At least one network interface 506 provides a connection between the equipment 10 and resolver 11.

Figure 6:
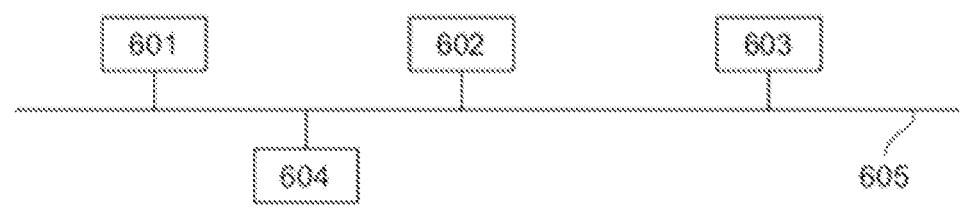

FIG. 6 represents a resolver 11 capable of implementing the different embodiments of the method for resolving naming identifiers according to FIGS. 2-4.

A resolver 11 can comprise at least one hardware processor 601, one storage unit 602, one interface 603, and at least one network interface 604 which are connected to each other through a bus 605. Of course, the constituent elements of the resolver 11 can be connected by means of a connection other than a bus.

The processor 601 controls the operations of the resolver 11. The storage unit 602 stores at least one program for implementing the method according to one embodiment to be executed by the processor 601, and various data, such as parameters used for calculations performed by the processor 601, intermediate data of calculations performed by the processor 601, etc. the processor 601 may be formed by any known and appropriate hardware or software, or by a combination of hardware and software. For example, the processor 601 can be formed by a dedicated hardware such as a processing circuit, or by a programmable processing unit such as a central processing unit which executes a program stored in a memory thereof.

The storage unit 502 may be formed by any appropriate means capable of storing the program(s) and data in a computer readable manner. Examples of storage unit 602 comprise non-transitory computer-readable storage media such as semiconductor memory devices, and magnetic, optical, or magneto-optical recording media loaded into a read and write unit.

The interface 603 provides an interface between the resolver 11 and at least the authoritative server 12.

At least one network interface 504 provides a connection between the resolver 11 and the equipment 10.

Figure 7:
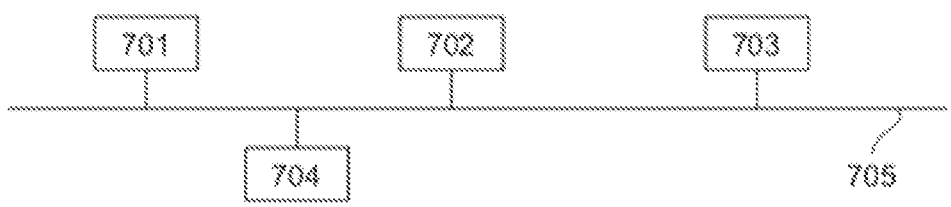

FIG. 7 represents an authoritative server 12 capable of implementing the different embodiments of the communication method according to FIGS. 2-4.

An authoritative server 12 can comprise at least one hardware processor 701, one storage unit 702, one interface 703, and at least one network interface 704 which are connected to each other through a bus 705. Of course, the constituent elements of the authoritative server 12 can be connected by means of a connection other than a bus.

The processor 701 controls the operations of the authoritative server 12. The storage unit 702 stores at least one program for the implementation of the method according to one embodiment to be executed by the processor 701, and various data, such as parameters used for calculations performed by the processor 701, intermediate data of calculations performed by the processor 701, etc. The processor 701 may be formed by any known and appropriate hardware or software, or by a combination of hardware and software. For example, the processor 701 can be formed by a dedicated hardware such as a processing circuit, or by a programmable processing unit such as a central processing unit which executes a program stored in a memory thereof.

The storage unit 702 may be formed by any appropriate means capable of storing the program(s) and data in a computer readable manner. Examples of storage unit 702 comprise non-transitory computer-readable storage media such as semiconductor memory devices, and magnetic, optical, or magneto-optical recording media loaded into a read and write unit.

The interface 703 provides an interface between the authoritative server 12 and the resolver 11.

At least one network interface 704 provides a connection between the authoritative server 12 and other servers associated with naming identifiers.

The invention claimed is:

1. A method for resolving at least one naming identifier, said method being implemented by a naming identifier resolver and comprising:
   receiving, from equipment, a request for resolving a naming identifier and a message comprising a piece of information of authorization to share a parameter representative of said equipment,
   receiving at least one network address of a first content server associated with said naming identifier, the first content server requiring said parameter relating to said equipment,
   receiving at least one network address of a second content server associated with said naming identifier, the second content server requiring no parameter relating to said equipment, and
   transmitting, to the equipment requiring the resolution of said naming identifier, at least one of said at least one network address associated with the first content server or said at least one network address associated with the second content server depending on said received piece of information of authorization to share said parameter representative of said equipment.

2. The method for resolving at least one naming identifier, according to claim 1, wherein the parameter relating to the equipment is a location parameter of the equipment.

3. The method for resolving at least one naming identifier according to claim 1, wherein, when the value of the piece of information of authorization to share said parameter representative of said equipment is non-zero, the resolver transmits said at least one network address of one of the first content server or the second content server to the equipment requiring the resolution of said naming identifier.

4. The method for resolving at least one naming identifier according to claim 1, wherein, in response to the value of the piece of information of authorization to share said parameter relating to said equipment being zero, the resolver transmits said at least one network address of the first content server and said at least one network address of the second content server to the equipment requiring the resolution of said naming identifier.

5. The method for resolving at least one naming identifier according to claim 1, wherein the message comprising the piece of information of authorization to share said parameter relating to the equipment is a request for resolving the naming identifier transmitted by the equipment.

6. The method for resolving at least one naming identifier according to claim 1, wherein the message comprising the piece of information of authorization to share said parameter relating to the equipment is a request message for establishing a communication session, between the equipment and the naming identifier resolver, transmitted by the equipment.

7. The method for resolving at least one naming identifier according to claim 1, comprising, prior to receiving the at least one network address associated with the first content server, transmitting at least one message requiring the transmission of the at least one network address of the first content server and said at least one network address of the second content server both associated with the same naming identifier, the first content server requiring the parameter relating to the equipment requiring resolution of the naming identifier, and the second content server not requiring said parameter relating to the equipment.

8. A method for requesting a resolution of at least one naming identifier, said method being implemented by equipment and comprising at least:
   providing a piece of information of authorization to share a parameter relating to the equipment having a value selected from a plurality of values comprising a non-zero value and a zero value;
   transmitting a request for resolving a name identifier and a message, comprising said piece of information of authorization to share a parameter relating to the equipment, to a naming identifier resolver; and
   receiving at least one of at least one network address associated with a first content server requiring said parameter relating to said equipment or at least one network address associated with a second content server requiring no parameter relating to said equipment, said at least one network address being transmitted depending on the transmitted piece of information of authorization to share and taken into account in the resolution of said at least one identifier, wherein the receiving comprises:
      when the value of the piece of information of authorization to share said parameter representative of said equipment is non-zero, receiving at least one network address of one of the first content server or the second content server, else
      when the value of the piece of information of authorization to share said parameter representative of said equipment is zero, receiving at least one network address of the first content server and said at least one network address of the second content server.

9. The method for requesting a resolution of at least one naming identifier according to claim 8, wherein the message comprising the piece of information of authorization to share said parameter relating to the equipment is a request for resolving the naming identifier.

10. The method for requesting a resolution of at least one naming identifier according to claim 8, wherein the message comprising the piece of information of authorization to share said parameter relating to the equipment is a request message for establishing a communication session between the equipment and the naming identifier resolver.

11. A naming identifier resolver comprising:
a processor; and
a non-transitory computer-readable medium comprising instructions stored thereon which when executed by the processor configure the naming identifier resolver to:
receive, from equipment, a request for resolving a naming identifier and a message comprising a piece of information of authorization to share a parameter representative of said equipment,
receive at least one network address of a first content server associated with said naming identifier to be resolved, the first content server requiring said parameter relating to said equipment,
receive at least one network address of a second content server associated with said naming identifier, the second content server requiring no parameter relating to said equipment, and
transmit, to the equipment requiring the resolution of said naming identifier, at least one of said at least one network address associated with the first content server or said at least one network address associated with the second content server depending on said received piece of information of authorization to share said parameter relating to said equipment.

12. Equipment requiring a resolution of at least one naming identifier, said equipment comprising:
a processor; and
a non-transitory computer-readable medium comprising instructions stored thereon which when executed by the processor configure the equipment to:
provide a piece of information of authorization to share a parameter relating to the equipment having a value selected from a plurality of values comprising a non-zero value and a zero value;
transmit a request for resolving a name identifier and a message, comprising-a said piece of information of authorization to share a parameter relating to the equipment, to a naming identifier resolver; and
receive at least one of a network address associated with the first content server requiring said parameter relating to said equipment or at least one network address associated with a second content server requiring no parameter relating to said equipment, said at least one network address being transmitted depending on the transmitted piece of information of authorization to share and taken into account in the resolution of said at least one identifier, wherein the receiving comprises:
when the value of the piece of information of authorization to share said parameter representative of said equipment is non-zero, receiving at least one network address of one of the first content server or the second content server, else
when the value of the piece of information of authorization to share said parameter representative of said equipment is zero, receiving at least one network address of the first content server and said at least one network address of the second content server.

13. A non-transitory computer-readable medium comprising a computer program product stored thereon comprising program code instructions for implementing a method or resolving at least one naming identifier, when executed by a processor of a naming identifier resolver, wherein the method comprises:
receiving, from equipment, a request for resolving a naming identifier and a message comprising a piece of information of authorization to share a parameter representative of said equipment,
receiving a network address of a first content server associated with said naming identifier, the first content server requiring said parameter relating to said equipment,
receiving at least one network address of a second content server associated with said naming identifier, the second content server requiring no parameter relating to said equipment, and
transmitting, to the equipment requiring the resolution of said naming identifier, at least one of said at least one network address associated with the first content server or said at least one network address associated with the second content server depending on said received piece of information of authorization to share said parameter representative of said equipment.

14. A non-transitory computer-readable medium comprising a computer program product stored thereon comprising program code instructions for implementing a method for requesting a resolution of at least one naming identifier, when executed by a processor of equipment, the method comprising:
providing a piece of information of authorization to share a parameter relating to the equipment having a value selected from a plurality of values comprising a non-zero value and a zero value;
transmitting a request for resolving a name identifier and a message, comprising said piece of information of authorization to share a parameter relating to the equipment, to a naming identifier resolver; and
receiving at least one of a network address associated with a first content server requiring said parameter relating to said equipment or at least one network address associated with a second content server requiring no parameter relating to said equipment, said at least one network address being transmitted depending on the transmitted piece of information of authorization to share and taken into account in the resolution of said at least one identifier, wherein the receiving comprises:
when the value of the piece of information of authorization to share said parameter representative of said equipment is non-zero, receiving at least one network address of one of the first content server or the second content server, else
when the value of the piece of information of authorization to share said parameter representative of said equipment is zero, receiving at least one network address of the first content server and said at least one network address of the second content server.

15. A method for resolving at least one naming identifier, said method being implemented by a naming identifier resolver and comprising:
receiving, from equipment, a request for resolving a naming identifier and a message comprising a piece of information of authorization to share a parameter representative of said equipment,
receiving at least one network address of a first content server associated with said naming identifier, the first content server requiring said parameter relating to said equipment, and
transmitting, to the equipment requiring the resolution of said naming identifier, said at least one network address associated with the first content server depending on said received piece of information of authorization to share said parameter representative of said equipment,
wherein, in response to a value of the piece of information of authorization to share said parameter relating to said equipment being zero, the naming identifier resolver transmits said at least one network address associated with the first content server and at least one network address of a second content server to the equipment requiring the resolution of said naming identifier.

\* \* \* \* \*